United States Patent
Lee

(10) Patent No.: US 7,136,113 B2
(45) Date of Patent: Nov. 14, 2006

(54) DIGITAL TELEVISION RECEIVER AND METHOD OF CONTROLLING ANTENNA OF THE SAME

(75) Inventor: Tae Won Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 987 days.

(21) Appl. No.: 09/916,517

(22) Filed: Jul. 30, 2001

(65) Prior Publication Data
US 2002/0051085 A1    May 2, 2002

(30) Foreign Application Priority Data
Jul. 28, 2000   (KR) ................. 2000-43707

(51) Int. Cl.
H04N 5/44    (2006.01)
(52) U.S. Cl. .............. 348/725; 348/21; 348/731; 348/570; 725/72
(58) Field of Classification Search ........ 348/725–726, 348/731–733, 570, 21, 674, 678, 685, 555, 348/727; 342/359, 74–75, 77; 455/67.1, 455/67.2–67.7, 25, 226.1, 226.2, 3.02; 725/72; 375/232
See application file for complete search history.

(56) References Cited
U.S. PATENT DOCUMENTS

| | | | | |
|---|---|---|---|---|
| 5,376,941 A | * | 12/1994 | Fukazawa et al. | 342/359 |
| 5,515,058 A | * | 5/1996 | Chaney et al. | 342/359 |
| 5,638,140 A | * | 6/1997 | Krishnamurthy et al. | 348/735 |
| 6,049,361 A | * | 4/2000 | Kim | 348/678 |
| 6,229,480 B1 | * | 5/2001 | Shintani | 342/359 |
| 6,334,218 B1 | * | 12/2001 | Jeong et al. | 725/72 |
| 6,509,934 B1 | * | 1/2003 | Bao et al. | 348/570 |
| 6,661,373 B1 | * | 12/2003 | Holliday | 342/359 |
| 6,697,610 B1 | * | 2/2004 | Tait | 455/277.1 |

* cited by examiner

Primary Examiner—Trang U. Tran
(74) Attorney, Agent, or Firm—Birch, Stewart, Kolasch & Birch, LLP

(57) ABSTRACT

Disclosed is an antenna controller of a digital television receiver and a controlling method thereof including an antenna receiving channel signals of digital television broadcasting and having a directionality dependent on a control signal, a signal processing part tuning a wanted channel signal from the channel signals and processing the tuned channel signal as a wanted form, a detection part detecting state signals of the channel signal outputted from the signal processing part, a memory, when every new state signal is detected, storing the detected new state signal sorted with previously-detected state signals, a control part producing the control signal corresponding to an optimal direction of the antenna by comparing the new state signal to the previous state signals, and an interface part providing the antenna with the control signal, thereby enabling to increase the integration of the receiver.

17 Claims, 18 Drawing Sheets

DIGITAL TELEVISION RECEIVER AND METHOD OF CONTROLLING ANTENNA OF THE SAME

BACKGROUND OF THE INVENTION

1. Field of the Invention

The present invention relates to a digital television receiver and method of controlling an antenna of the same, and more particularly, to an antenna controller of a digital television receiver and a controlling method thereof.

2. Background of the Related Art

VSD (Vestigial Side Band) has been chosen as a standard form for transmitting a terrestrial microwave channel in digital television broadcasting. Thus, concepts and ideas have been made to propose the early-stage antennas for a VSB receiver, and ATSC prepares the standardization of the VSB antennas. Yet, no antenna applied to a digital television receiver has been introduced in public, and further has been commercialized.

Generally, antennas able to be used for digital television receivers are mainly divided into two categories.

First, there is a general outdoor antenna having a benefit of high receive performance but having defects such as large size and installment inconvenience.

Second, there is an indoor antenna having benefits of small size and installment convenience but defects such that a viewer has to adjust a direction of the antenna by monitoring a screen in direct when a receive sensitivity is reduced.

Besides, a plurality of multi-paths and frequency obstacles have a chance to exist in the terrestrial channels in the digital television broadcasting. Therefore, receive characteristics of an antenna of a digital television receiver may have a great influence on the entire characteristics of the digital television receiver. Other antennas and their problems depending on their environments are described as follows by referring to FIG. 1 to FIG. 3.

FIG. 1 to FIG. 3 show diagrams of a no-directional antenna, a directional antenna, and a smart antenna, respectively.

First, a television receiver using a non-directional antenna in FIG. 1 enables to receive the major signal from all directions only through the channels where intensity of the main signal is strong while signals in multi-paths are weak. Yet, the television receiver in FIG. 1 fails to easily receive the wanted channel in the channels where the main signal is weak and the signals in the multi-paths are strong through indoor antennas, downtown-building-area antennas and the like, thereby reducing the performance of the digital television receiver.

Second, a direction antenna in FIG. 2 may be used in order to overcome the defects of the non-directional antenna. Yet, the main signal may be blocked by the moving obstacles against radio waves under the circumstance that states of the channels vary severely. In this case, it is difficult for the antenna to receive the main signal from other directions, whereby the performance of the digital television receiver is reduced as well. As mentioned in the foregoing explanation, the non-directional antenna has a trade-off relation with the directional antenna.

Third, a smart antenna in FIG. 3 may be considered as a solution so as to solve the problems of the non-directional and directional antennas. The above defects/problems may be settled by making use of the smart antenna on the assumption of the existence of a control system.

SUMMARY OF THE INVENTION

Accordingly, the present invention is directed to an antenna for a digital television receiver, controller and controlling method of the same that substantially obviates one or more problems due to limitations and disadvantages of the related art.

An object of the present invention is to provide an antenna for a digital television receiver, controller and controlling method of the same enabling to increase integration of the digital television receiver by constructing the antenna with a single chip.

Another object of the present invention is to provide an antenna for a digital television receiver, controller and controlling method of the same enabling to construct the antenna with a simple hardware so as to reduce a product cost.

A further object of the present invention is to provide an antenna for a digital television receiver, controller and controlling method of the same having a prompt judgment and high reliance.

Another further object of the present invention is to provide an antenna for a digital television receiver, controller and controlling method of the same compatible with other digital television receivers by being operated independently from the digital television receiver.

In order to attain the objectives, an antenna controller of a digital television receiver according to the present invention is constructed with digital control parts and operated separately and independently from the digital television receiver and extracts channel information from a receive chip only without using additional hardware. Moreover, an antenna controller of a digital television receiver according to the present invention attains channel information for controlling an antenna from an automatic gain controller as an initial step in a demodulation part of a digital television receiver, a data segment synchronizer as a middle step, an equalizer as a terminal step, and an SNR calculator step by step. Further, the antenna is controlled to maintain an optimal state using the extracted information. Accordingly, an apparatus and method according to the present invention enables to optimize the antenna of the digital television receiver at a severely-varying channel environment of the terrestrial microwave all the time and further improve the performance of the digital television receiver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital television receiver includes an antenna receiving channel signals of digital television broadcasting and having a directionality dependent on a control signal, a signal processing part tuning a wanted channel signal from the channel signals and processing the tuned channel signal as a wanted form, a detection part detecting state signals of the channel signal outputted from the signal processing part, a memory, when every new state signal is detected, storing the detected new state signal sorted with previously-detected state signals, a control part producing the control signal corresponding to an optimal direction of the antenna by comparing the new state signal to the previous state signals, and an interface part providing the antenna with the control signal.

In another aspect of the present invention of a digital television receiver having an antenna of which direction is adjustable, an antenna controller, and a memory, a method of controlling an antenna of a digital television receiver includes a step (a) of storing an effective power of the channel signal received through the antenna in the memory by rotating the direction of the antenna and selecting an antenna pattern when a maximum signal power is detected, a step (b) of aligning the stored antenna patterns in order of sizes of the stored signal powers, and a step (c) of detecting states of the channel signal, a power of the channel signal, a maximum ghost power, and a signal vs. noise ratio and then changing a pattern of the antenna in accordance with the detected values.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
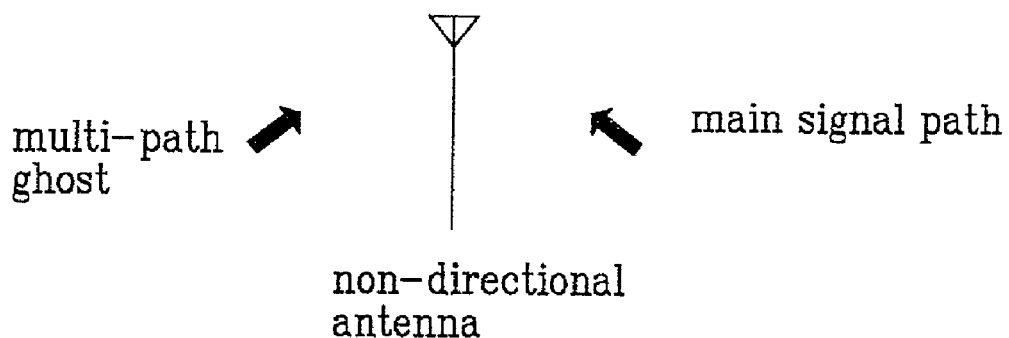
FIG. 1 illustrates a diagrams of a non-directional antenna.
Figure 2:
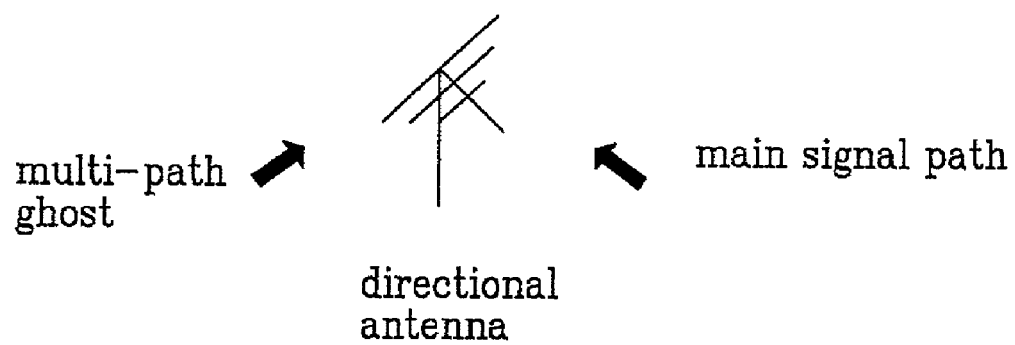
FIG. 2 illustrates a diagram of a directional antenna.
Figure 3:
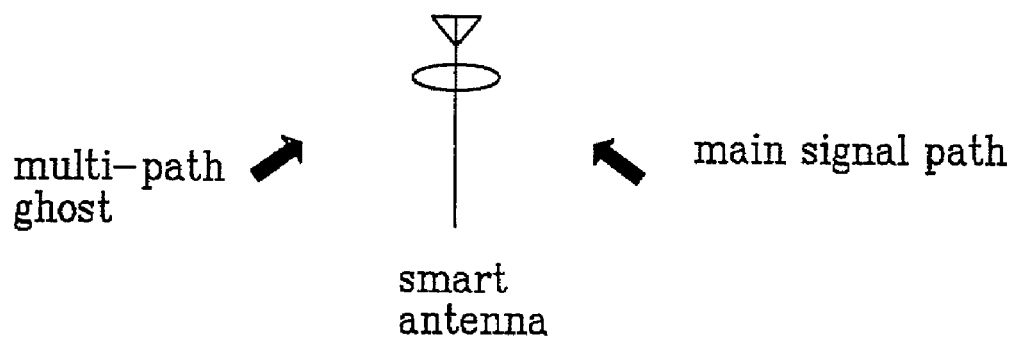
FIG. 3 illustrates a diagram of a smart antenna.
Figure 4:
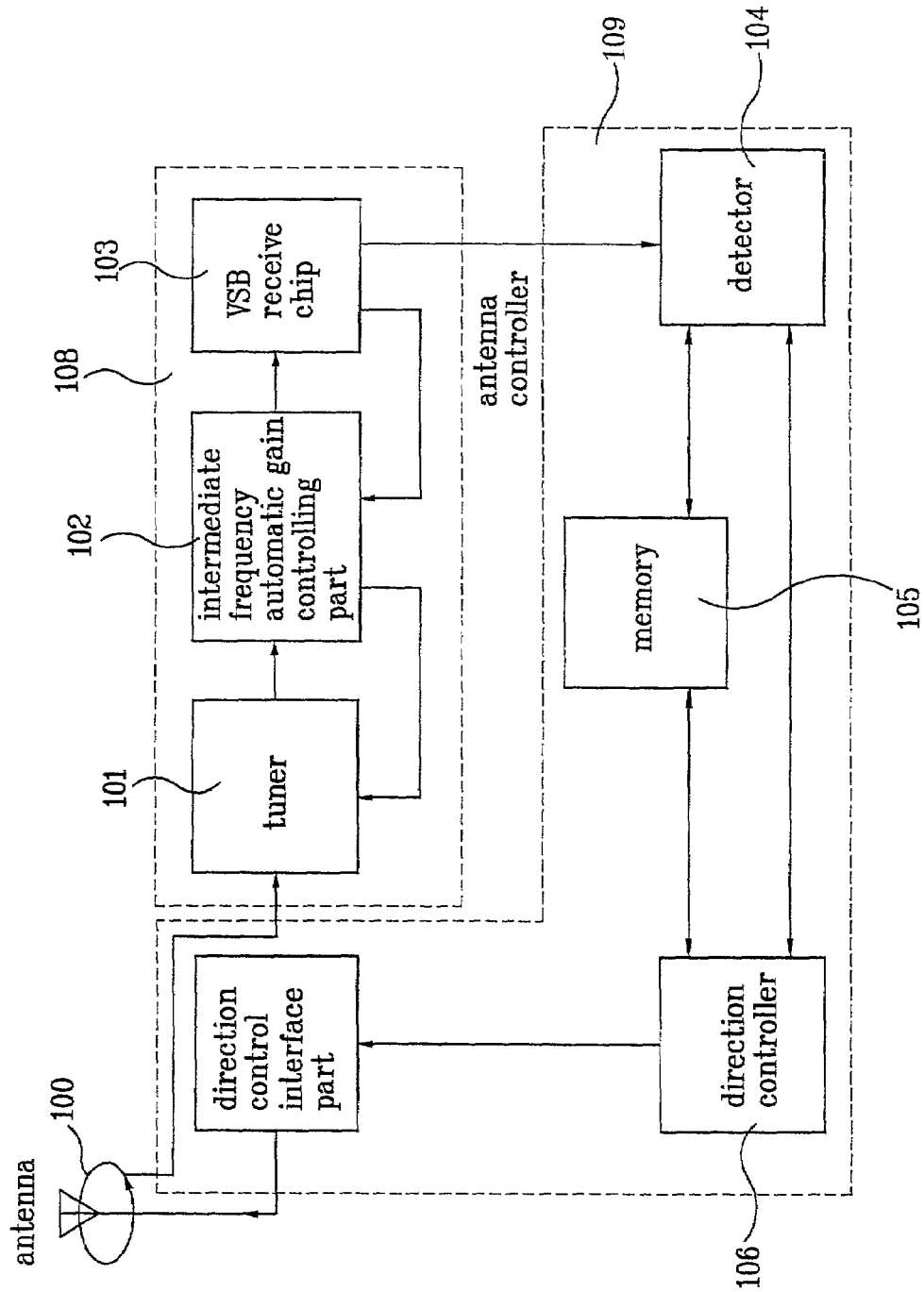
FIG. 4 illustrates a construction diagram of a digital television receiver having an antenna and a controller of the antenna according to the present invention.

FIG. 4 illustrates a construction diagram of a digital television receiver having an antenna and a controller of the antenna according to the present invention. FIG. 4 is mainly constructed with a channel signal processing part 108 of a digital television receiver and an antenna controller 109.

Referring to FIG. 4, the channel signal processing part 108 of the digital television receiver is constructed with a tuner 101 tuning a wanted channel signal among channel signals received through an antenna 100(a smart antenna is used in this embodiment of the present invention but various other antennas may be realized in this embodiment) present of the digital television receiver, an intermediate frequency automatic gain controlling part 102 adjusting an intermediate frequency IF gain of the channel signal tuned by the tuner 101 automatically, and a VSB receive chip 103 taking a VSB (vestigial side band) signal from a channel signal of the intermediate frequency automatic gain controlling part 102.

The antenna controller 109 is constructed with a detector 104 attaining state signals such as a channel signal power from the channel signal taken by the VSB receive chip 103 of the channel signal processing part 108, a ghost signal power, a ratio between a signal and a noise and the like, a memory 105 storing the state signals therein and updating storage values with newly-detected state signals, a direction controller 106 attaining a control signal to control a direction of the antenna 100 by comparing the state signals of the detector 104 and the previous state signals stored in the memory 105, and an interface part 107 connected between the antenna 100 and the tuner 101 and controlling the direction of the antenna 100 in accordance with the control signal.

Figure 5:
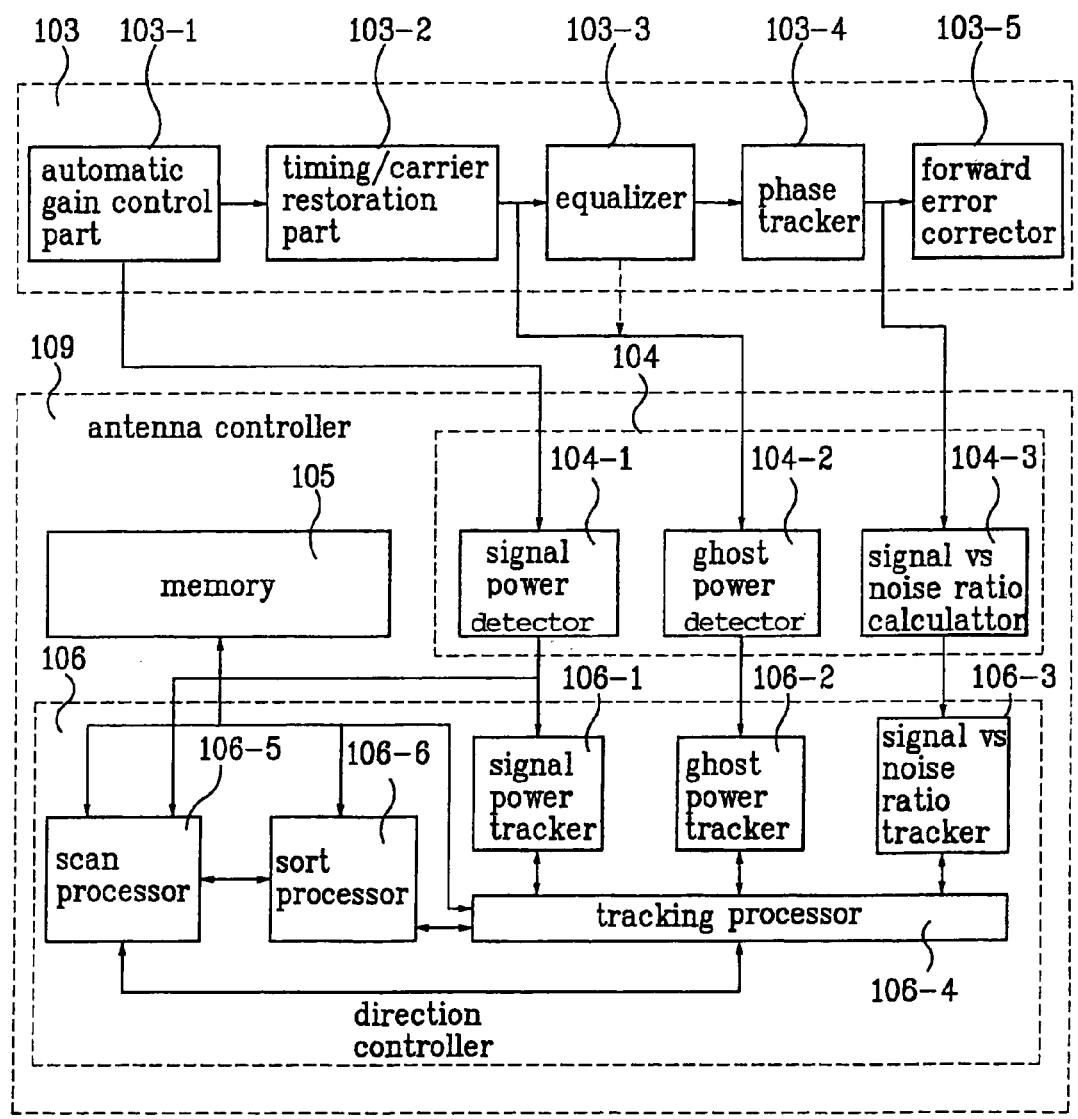
FIG. 5 illustrates a block diagram showing parts in FIG. 4 in detail.

FIG. 5 illustrates a block diagram showing parts in FIG. 4 in detail.

Referring to FIG. 5, the VSB receive chip 103 in FIG. 4 is constructed with an automatic gain control part 103-1 controlling a gain of an output signal of the interme4diate frequency automatic gain control part 102 automatically, a timing and carrier restoration part 103-2 restoring the timing and carrier loss on an output of the automatic gain control part 103-1, an equalizer 103-3 equalizing an output of the timing and carrier restoration part 103-2, a phase tracker 103-4 tracking down a phase of an output signal of the equalizer 103-3, and a forward error corrector 103-5 outputting a final VSB signal by correcting a forward error on an output signal of the phase tracker 103-4.

The detector 104 is constructed with a signal power detector 104-1 detecting a power of the tuned channel signal using an automatic gain control signal from the automatic gain controller 103-1 of the VSB receive chip 103, a ghost power detector 104-2 detecting a power of a ghost signal using a signal from the equalizer 103-3 and/or an output signal of the timing and carrier restoration part 103-2 of the VSB receive chip 103, and a signal vs. noise ratio (SNR) calculator 104-3 calculating a ratio between a signal and a noise using an output of the phase tracker 103-4 of the VSB receive chip 103.

The direction controller 106 in FIG. 4 is constructed with a signal power tracker 106-1 tracking down a power of the tuned channel signal using an output signal of the signal power detector 104-1, a ghost power tracker 106-2 tracking down a power of the ghost signal using an output signal of the ghost power detector 104-2, a signal vs. noise ratio (SNR) tracker 106-3 tracking down a ratio between a signal and a noise using an output of the signal vs. noise ratio calculator 104-3 of the detector 104, a tracking processor 106-4 tracking down state signals of the tuned channel signal using output signals of the trackers 106-1 to 106-3 in a presently-selected antenna pattern and then changing the antenna pattern in order stored in the memory 105 if the tracked state signals fail to maintain effective value sizes, a scan processor 106-5 attaining an effective signal power and antenna pattern by varying a direction of the antenna 100 using a state signal of the tracking processor 106-4 and then storing the power and pattern values in the memory 105, and a sort processor 106-6 aligning the stored antenna pattern values in order of the signal power values. Besides, the direction controller 106 makes the scan processor 106-5 carry out the scanning again if it is judged that there is no antenna pattern having an effective size in the memory 105 by the operation of the tracking processor 106-4.

Operations of the respective major elements in FIG. 4 and FIG. 5 are described as follows. The antenna 100 responds to a mechanical or electrical control signal from outside so as to adjust its beam width, gain, frequency characteristic and the like and further construct an optimal pattern for receiving a wanted channel.

Figure 6:
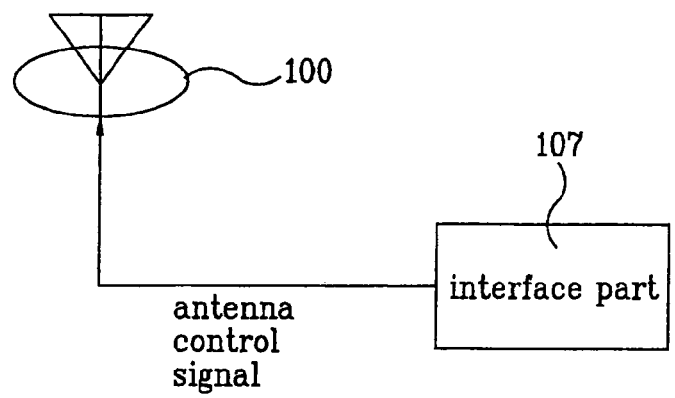
FIG. 6 illustrates a block diagram of an interface part for connecting an antenna to an antenna controller.

The interface part 107, as shown in FIG. 6, connects the antenna 100 to the antenna controller 109.

A procedure of detecting a signal power of the tuned channel signal is explained as follows.

Figure 7:
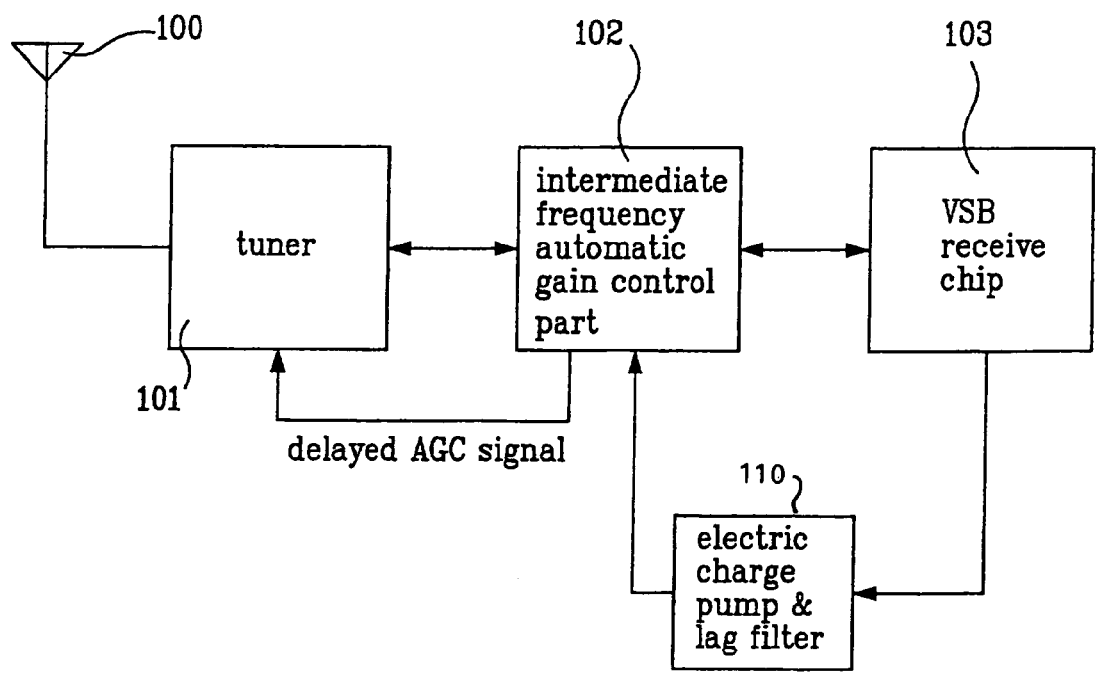
FIG. 7 illustrates a block diagram for explaining a method of controlling an automatic gain using an automatic gain control signal delayed by a digital television receiver.
Figure 8:
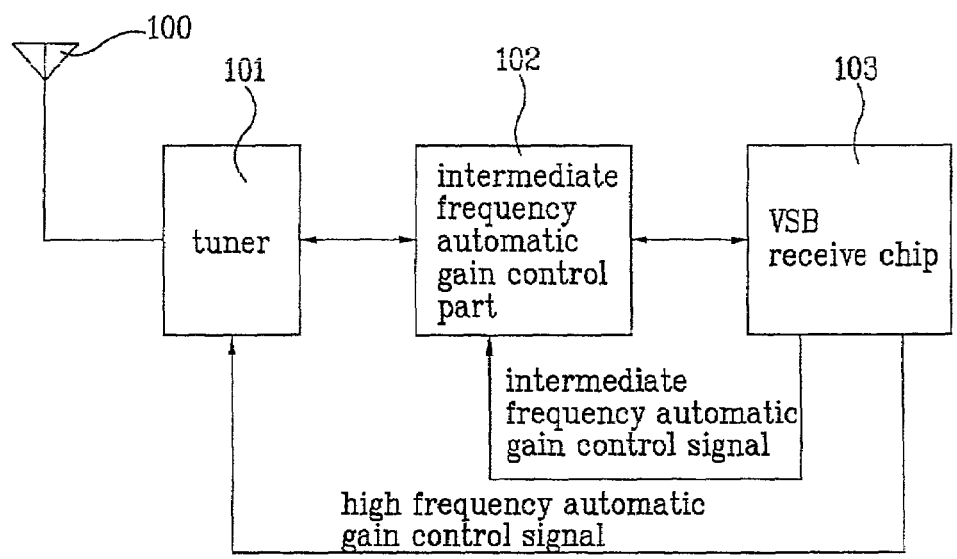
FIG. 8 illustrates a block diagram for explaining a method of controlling gains of high and intermediate frequency signals directly in a VSB receive chip.
Figure 9:
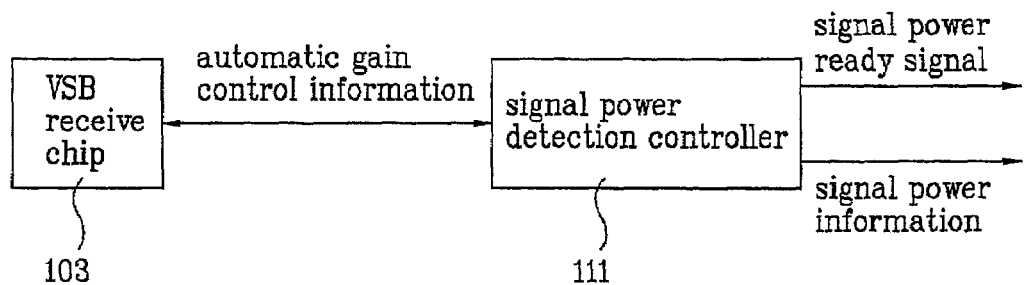
FIG. 9 illustrates a block diagram for explaining a signal power detection controller.

FIG. 7 illustrates a block diagram for explaining a system of controlling an automatic gain using an automatic gain control signal delayed by a digital television receiver, and FIG. 8 illustrates a block diagram for explaining a system of controlling gains of high and intermediate frequency signals directly in a VSB receive chip 103. The automatic gain control (AGC) system controls a gain of an intermediate frequency signal through a electric charge pump & lag filter 110 from the VSB receive chip 103 and a high frequency signal gain automatically using an automatic gain control signal delayed in the intermediate frequency automatic gain control part 102. In accordance with an automatic gain control system, the intermediate frequency signal and high frequency signal gain are controlled automatically by the VSB receive chip 103. Besides, the automatic gain control part 103-1 in FIG. 5 constructs a loop controlling one automatic gain control amplifier and the signal power detector 104-1 in FIG. 5 detects the signal power of the tuned channel signal from a storage part (ex. Integrator) storing a gain error included in the loop. A signal power detection controller (included in the signal power detector 104-1 in FIG. 5) 111 in FIG. 9 detecting a signal power ready signal and a signal power information from automatic gain control information outputted from the VSB receive chip 103 and then outputs the signal power ready signal and signal power information to the direction controller 106 of the antenna 100.

Figure 10:
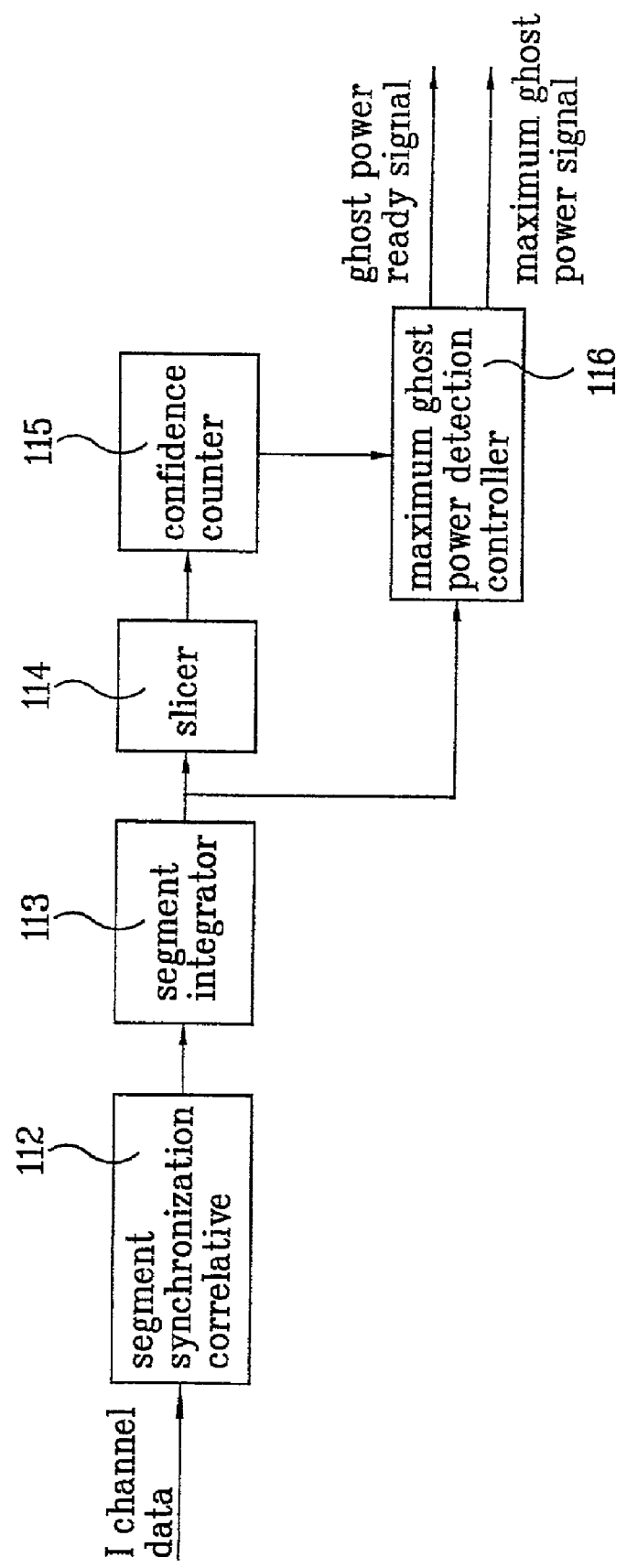
FIG. 10 illustrates a block diagram of a ghost signal power detector in detail.

The ghost signal power detector 104-2 in FIG. 5, as shown in FIG. 10, is constructed with a data segment synchronization correlative 112 calculating a correlation value between an I channel signal received from the VSB receive chip 103 and a previously-set synchronization signal value (cf. a synchronization value "1001" is inserted into each data segment in a VSB transmission system), a segment integrator 113 accumulating output values of the data segment synchronization correlative 112 in 832 delayers, a slicer 114 providing an increased count value when the accumulated correlation value reaches a predetermined size, a confidence counter 115 increasing the count number according to the increased count value, and a maximum ghost power detection controller 116 transferring a ghost power ready signal and a standardization value resulted from standardizing a maximum ghost power into a power of a receive signal to the direction controller 106 of the antenna in FIG. 4 when the value of the confidence counter 115 reaches a reference value.

Figure 11:
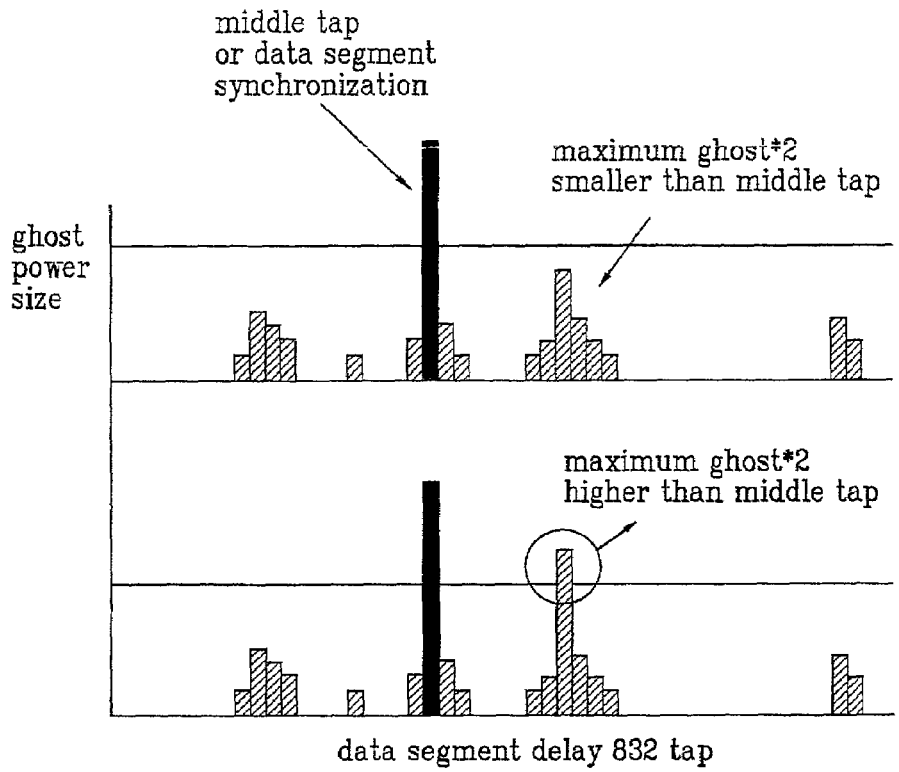
FIG. 11 illustrates an information graph of a ghost signal detected by a ghost power detector.

FIG. 11 illustrates an information graph of a ghost signal detected by the ghost power detector 104-2. Namely, the correlation value accumulated in the segment integrator 113 in FIG. 10 is shown in FIG. 11 where a tap having a maximum correlation value is a value accumulated by a main signal and another correlation value corresponding to a next size is a value accumulated by a ghost signal generated from the multi-paths.

The signal vs. noise ratio calculator 104-3 is explained in the following description in detail.

Figure 12:
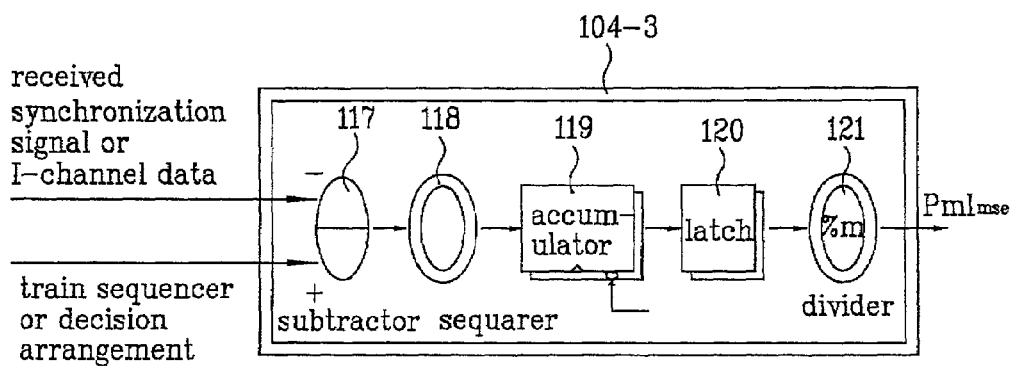
FIG. 12 illustrates a constructional block diagram of a signal vs. noise ratio calculator.

FIG. 12 illustrates a constructional block diagram of a signal vs. noise ratio calculator, in which a signal vs. noise ratio (SNR) is calculated using MSE (means square error). The signal vs. noise ratio calculator 104-3 in FIG. 12 may include a subtractor 117 subtracting a demodulated signal constellation (a received field synchronization signal or I-channel data) from a decision signal constellation (a train sequencer or decision signal arrangement), a squarer 118 squaring an output of the subtractor 117, an accumulator 119 accumulating outputs of the squarer 118 therein, a latch 120 delaying an output of the accumulator 119, and a divider 121 dividing an output of the latch 120 into a window size m of the segment integrator 113 of the ghost signal power detector 104-2. An algorithm of the signal vs. noise ratio according to the construction in FIG. 12 follows. First, a signal vs. noise ratio (SNR) is represented by the following formula (1).

$$SNR = 10 \log(Ps/Pn) \qquad (1),$$

where Ps is a signal power (=1) and Pn is a noise power (Pn|mse).

And, an algorithm of calculating a signal vs. noise ratio by a mean square error is represented by the following formula (2).

$$Pn|mse = sigma(k \text{ is } 1 \text{ to } n)(mse/m) \qquad (2)$$

In the formula (2), 'mse' may be represented by the following formula (3).

$$Mse = (D\_1 - R\_1)^2 \qquad (3)$$

In the formula (1) to formula (3), 'R_1' and 'D_1' are a demodulated signal constellation (received constellation) and a decided signal constellation (decision constellation), respectively, and 'm' designates a window size of the integrator 113.

The direction controller 106 and memory 105 in FIG. 4 and FIG. 5 are explained in the following description.

Figure 13:
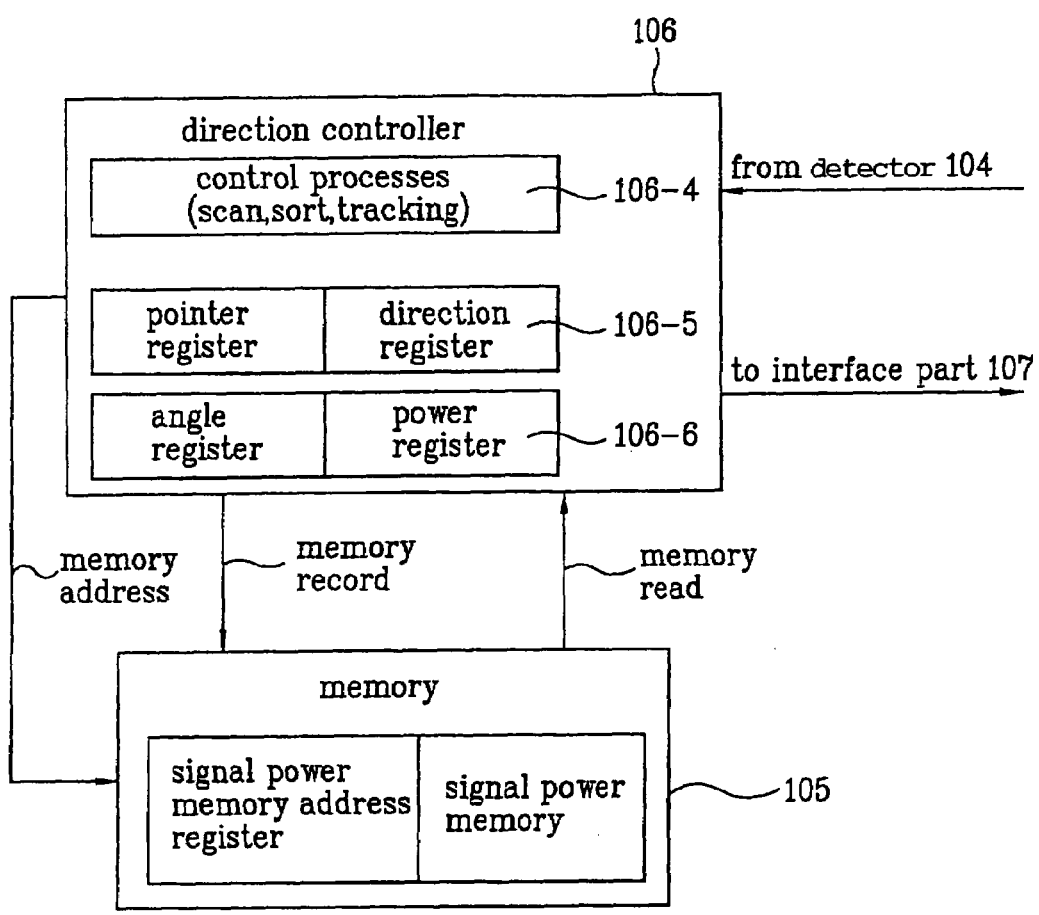
FIG. 13 illustrates a block diagram of parts of an antenna controller in detail.

FIG. 13 illustrates a block diagram of parts of an antenna controller in detail. Referring to FIG. 13, the direction controller 106 of the antenna controller 109 is constructed with the tracking processor 106-4, scan processor 106-5, sort processor 106-6, and general registers. The general registers shown in FIG. 13 include a pointer register representing a memory address, a direction register Dir_reg. always storing the present antenna state value, an angle register storing temporarily a state value of the antenna, and a power register storing a power value of a received signal temporarily. As shown in FIG. 13, the memory 105 stores a state value (or pattern value) of the antenna 100 and a corresponding power value of the received signal therein and aligns the stored power values in order of their sizes so as restore them therein.

Figure 14:
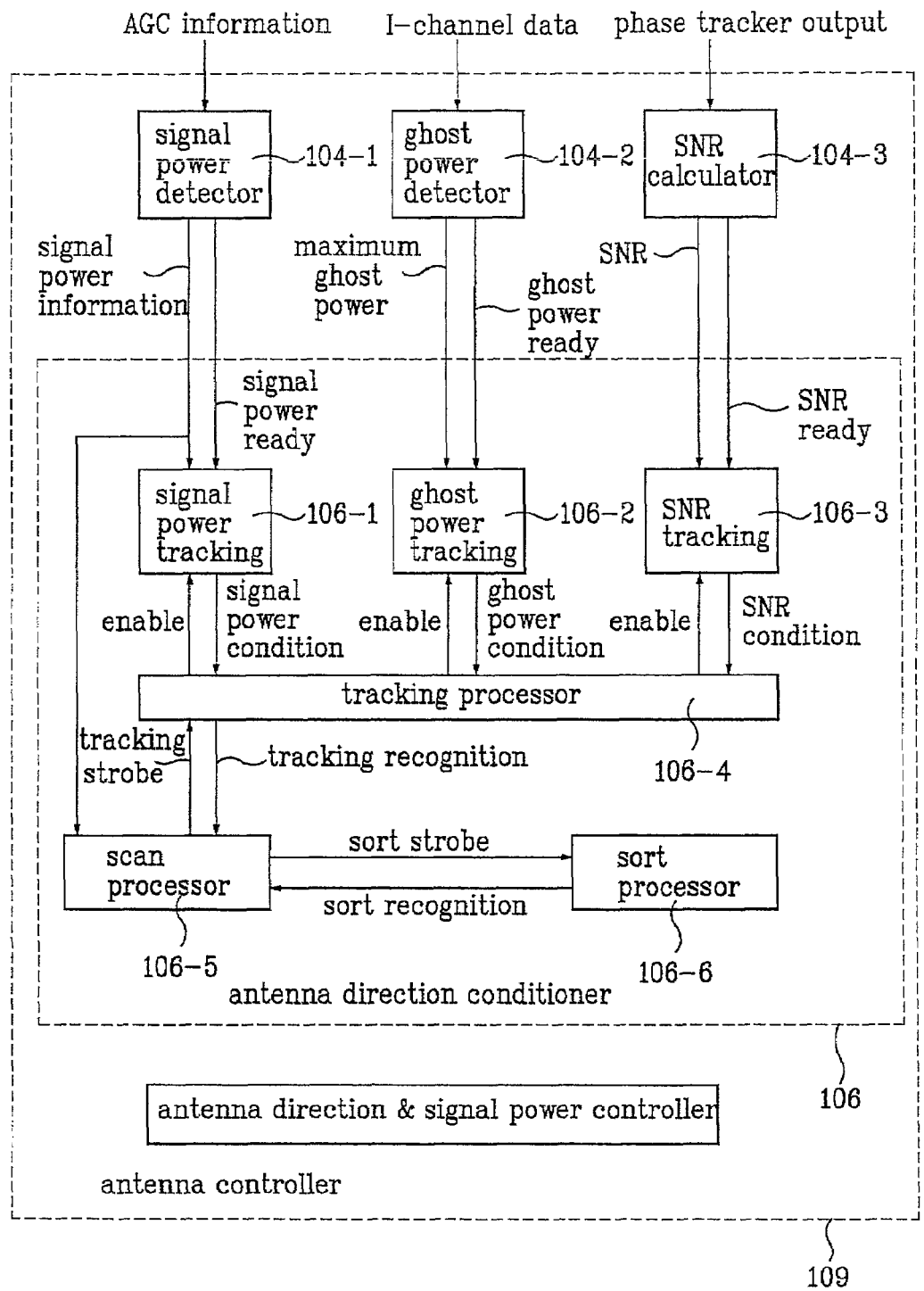
FIG. 14 illustrates a diagram of signals sent/received between elements of the antenna controller reciprocally.

FIG. 14 illustrates a diagram of signals sent/received between elements of the antenna controller reciprocally.

Figure 15:
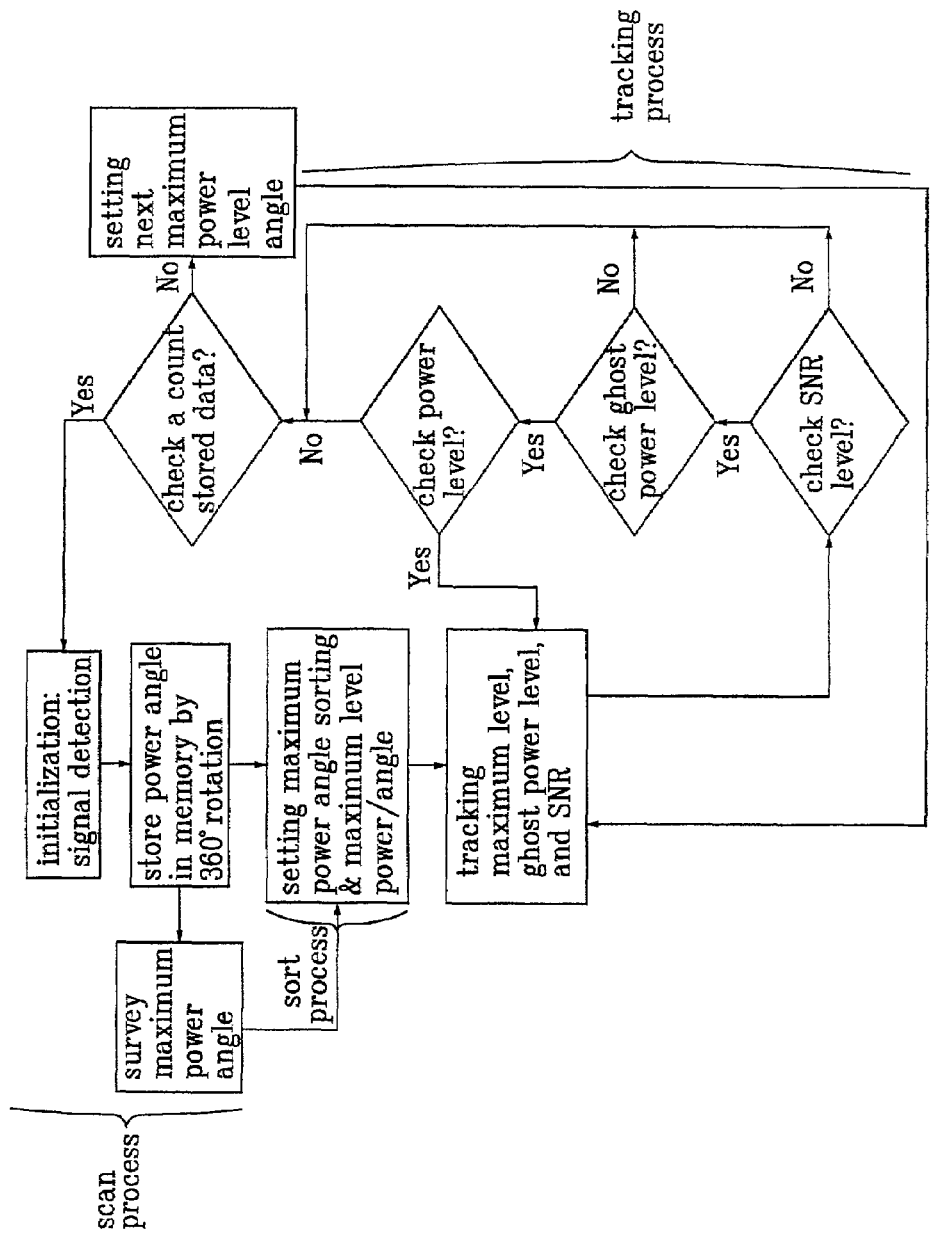
FIG. 15 illustrates an entire control flowchart of the antenna controller according to the present invention.

FIG. 15 illustrates an entire control flowchart of the antenna controller according to the present invention, which is mainly divided into a scan process of detecting and storing a channel signal, a sort process, and a tracking process.

In the scan process, the antenna controller detects whether a channel signal exists at an initialized state. If the channel signal is detected an effective power of the channel signal, which is being detected, is stored in the memory 105 by rotating the direction of the antenna 100 at 360° and an antenna pattern is selected when a maximum signal power is detected.

In the sort process, the antenna controller aligns the stored antenna patterns in order of the stored signal powers.

In the tracking process, the antenna controller detects states, i.e. a power of the channel signal, a maximum ghost power, and a signal vs. noise ratio, of the tuned channel signal in the presently-selected antenna pattern and then judges whether the detected values maintain effective sizes. In accordance with the result of the judgment, the antenna pattern is changed in order of the entire stored/aligned antenna patterns if the change of the antenna pattern is necessary. When there is no effective one in the entire antenna patterns stored in the memory, the antenna controller carries out the scan process again in order to get the effective signal power and antenna pattern. The above-mentioned processes observe the digital television receiver on real-time for the moving obstacles against waves such as people and the like, maintains the optimal state of the antenna according to the observation result, and further optimizes the performance of the digital television receiver.

Figure 16A:
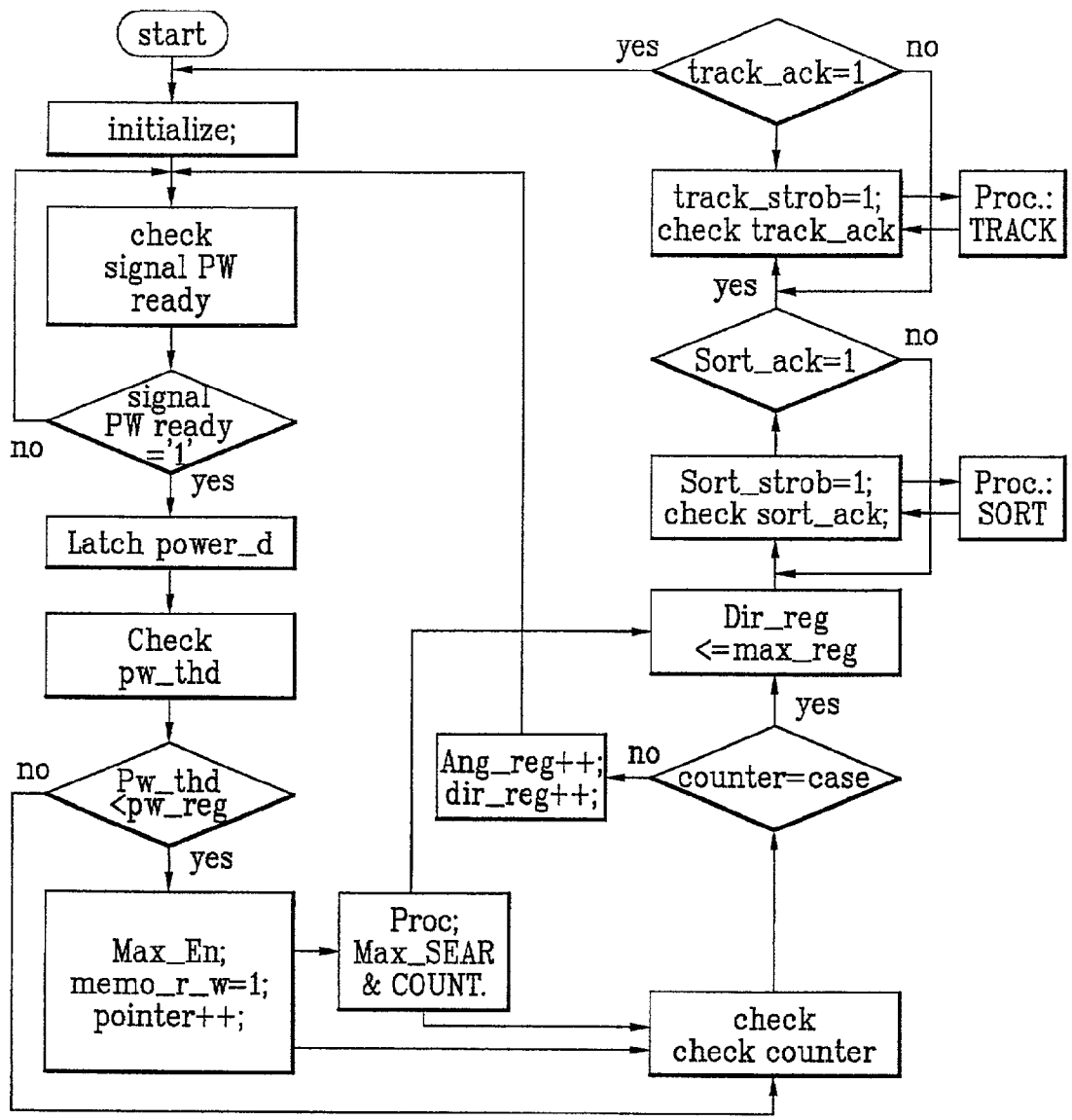
FIG. 16A illustrates a detailed flowchart of a scanning procedure in FIG. 15.

FIG. 16A illustrates a detailed flowchart of a scanning procedure in FIG. 15. Referring to FIG. 16A, the antenna controller checks whether the detection of a power of the received channel signal is ready after initialization (check signal power ready ?). If the detection is ready (signal PW ready='1'), a power value of the detected channel signal is taken (Latch power_d). It is then checked whether the power value of the detected channel signal is effective (check PW_thd). If it is verified that the power value is effective (PW_phd<PW_reg), the antenna controller starts a maximum search process of finding a maximum power value of the channel signal and a corresponding antenna pattern (Max_en). Subsequently, the power value of the channel signal stored temporarily in the angle and power registers and a corresponding antenna state are stored in the memory address designated by the pointer register (memo_r_w), and a value of the pointer register is incremented by '1' (Pointer++). Meanwhile, the antenna controller carries out a maximum value search process and a count process (proc.: MAX._SEAR. & COUNT). During carrying out the foregoing search process and count process, the antenna controller ascertains whether all the patterns of the possible antenna are tried. If all the patterns of the possible antenna fail to be tried, the respective registers of the direction controller 106 and the direction register value are incremented by '1' respectively (Ang._reg++; Dir._reg++). If all the patterns are tried, a pattern value (state value) of the antenna, of which maximum signal power is detected by the direction register in the memory 105, is set. Then, the sort processing procedure (or alignment processing procedure) is carried out through a sort processor (Sort_strob=1, Proc.: SORT), and it is verified whether the sort processing procedure is finished (check sort_ack=1). Subsequently, if the sort processing procedure is finished (Sort_ack=1), a tracking processing procedure is carried out through a tracking processor 106-4 (track_strob=1, Proc.:TRACK) and it is checked whether the tracking processing procedure is finished. If the tracking process is finished (track_ack=1), it goes back to the initialization process.

Figure 16B:
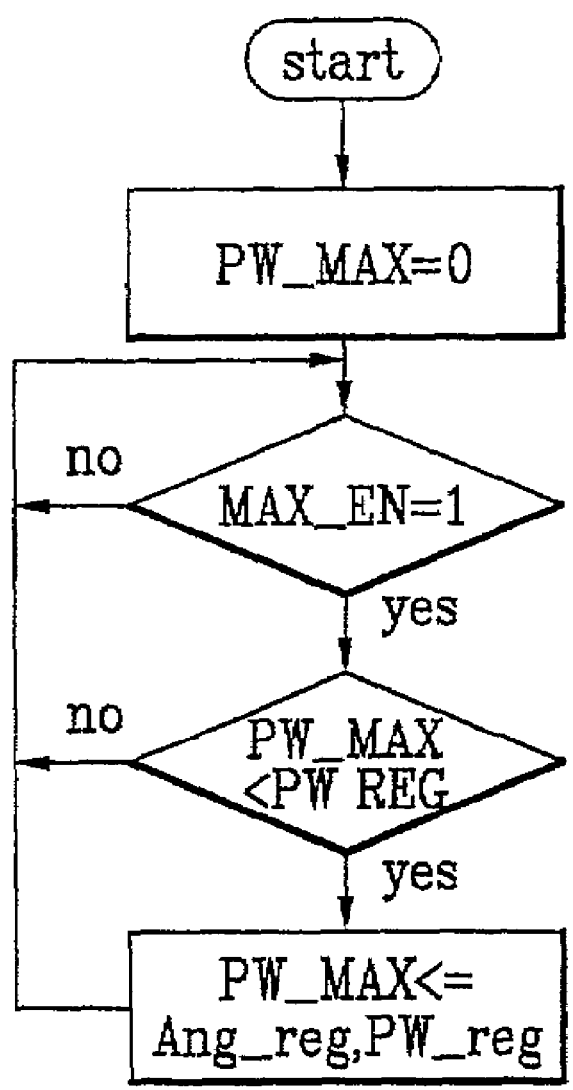
FIG. 16B illustrates a flowchart for searching a maximum power value of the tuned channel signal in the scanning procedure in FIG. 16A.

FIG. 16B illustrates a flowchart for searching a maximum power value of the tuned channel signal in the scanning procedure in FIG. 16A. First, the antenna controller sets a maximum power value of the channel signal as '0' (PW_MAX=0) and verifies whether the maximum value enabling signal is '1' (MAX_EN=1). When the maximum value enabling signal is '1' (MAX_EN=1), the value stored in the respective registers and power register is taken as the maximum signal power value provided that the present maximum signal power value is less than the value stored in the power register of the direction controller 106. And, a process of verifying the next maximum enabling signal proceeds.

Figure 16C:
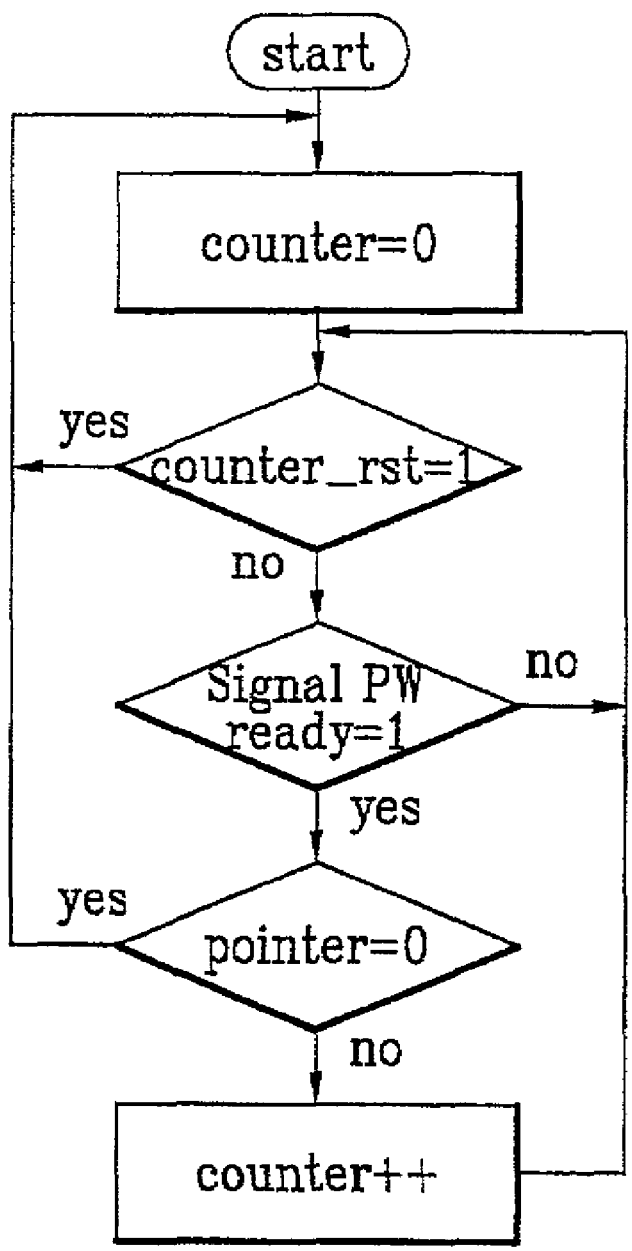
FIG. 16C illustrates a flowchart of a count procedure considering all antenna conditions in order to seek a maximum signal power value during the scanning procedure in FIG. 16A.

FIG. 16C illustrates a flowchart of a count procedure considering all antenna conditions in order to seek a maximum signal power value during the scanning procedure in FIG. 16A. Referring to FIG. 16C, a count value is set as zero (count=0). Then, it is ascertained that a counter reset signal is set as '1'. If the counter reset signal and the pointer value are not '1' and '0' respectively, the counter value is incremented by '1'. Then, it goes back to a process of ascertaining whether the counter reset signal is '1'. On the other hand, if the counter reset signal is '1', the signal power ready signal value is not '1' or the pointer value is '0', the controller goes back to the process of setting the counter value as '0'.

Figure 17:
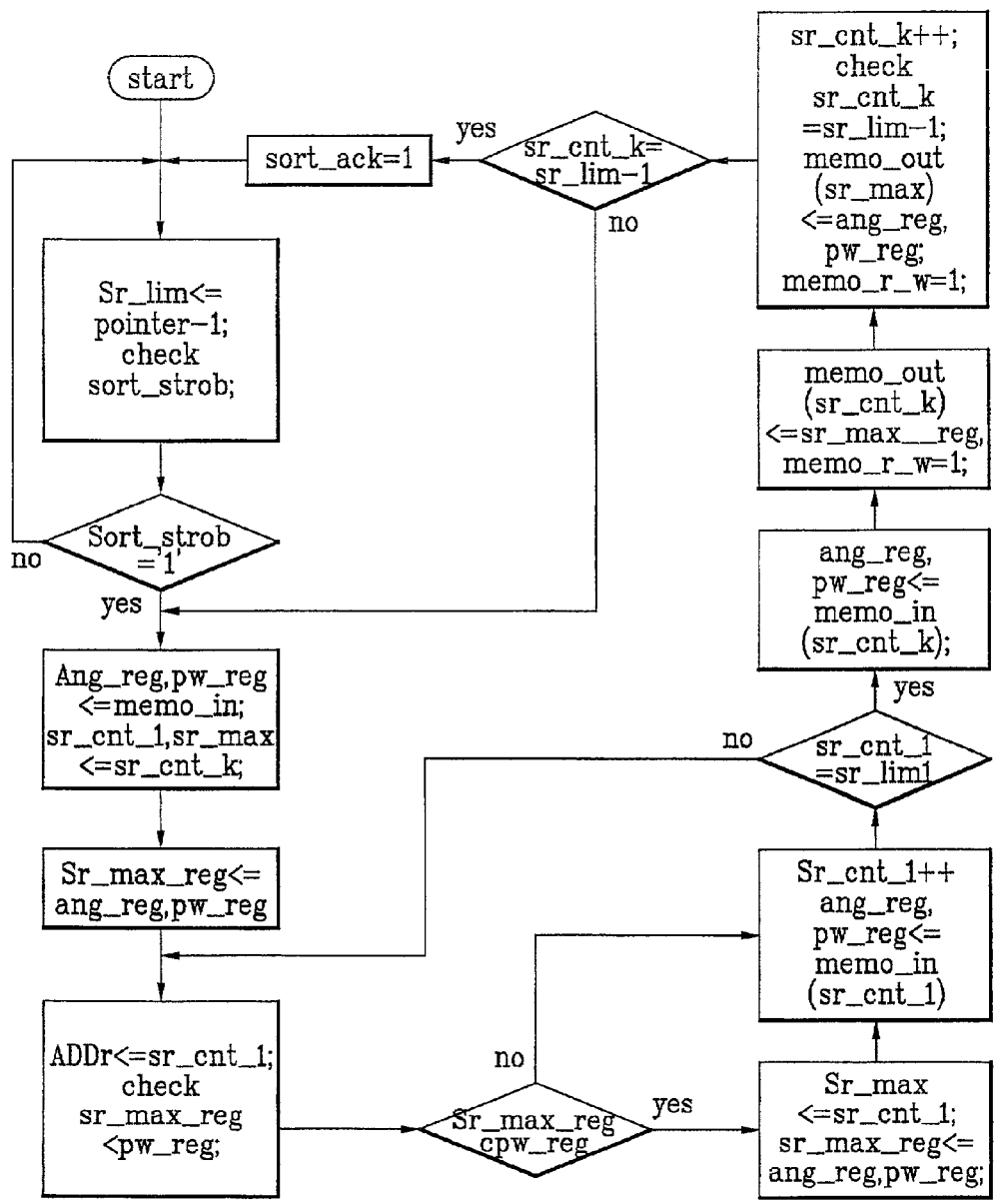
FIG. 17 illustrates a flowchart of showing an aligning process of data stored in a memory.

FIG. 17 illustrates a flowchart of showing an aligning process of data stored in a memory.

Referring to FIG. 17, the antenna controller 109 inputs a count of data stored in the memory 105 to a Sr_lim variable (Sr_lim<=pointer−1). Then, the scan process in FIG. 16A to FIG. 16C is checked (check sort_strob). If the scan process is finished (Sort strob='1'), data in the memory are read into the angle and power registers if the direction controller 106 (Ang_reg, PW_reg<=memo_in). Successively, a Sr_cnt_k value is inputted to an Sr_cnt value and an Sr_max variable respectively (Sr_max<=Sr_cnt_k), and the angle and power register values are inputted to an Sr_max_reg. variable in which a maximum value of the stored data is stored (Sr_max_reg.<=Ang._reg., PW_reg.). Subsequently, an Sr_cnt_1 value is inputted to an Addr variable generating the memory address (Addr<=Sr_cnt_1), and an Sr_max_reg. variable value storing the maximum value in the stored data is compared to a power register value (check Sr_maxreg.<PW_reg.). Next, the Sr_cnt_1 value is inputted to the Sr_max variable (Sr_max<=Sr_cnt_1), and the angle and power register value is inputted to the Sr_max_reg. variable storing the maximum value in the stored data (Sr_max_reg.<=Ang._reg., PW_reg.). After the Sr_cnt_1 value is incremented by '1' (Sr_cnt_1++), the memory data corresponding to the Sr_cnt_1 value is read by the angle and power registers (Ang._reg., PW_reg.<=memo_in (Sr_cnt_1)). After the Sr_cnt_1 value and the Sr_lim value are compared to each other (Sr_cnt_1=Sr_lim), the memory data corresponding to the Sr_cnt_k value is read by the angle and power registers (Ang._reg, PW_reg.<=memo_in (Sr_cnt_k)). Then, the antenna controller 109 stores the Sr_max_reg. value in the memory 105 corresponding to an address of the Sr_cnt_k value (memo_out(Sr_cnt_k)) and makes a state of the memory 105 enable to store a value (memo_r_w=1). After the Sr_cnt_k value is incremented by '1' (Sr_cnt_k++), it is checked whether the alignment is finished by comparing the Sr_cnt_k value to the Sr_lim_1 value (check Sr_cnt_k=Sr_lim_1). After the angle and power register values are stored in the memory having an address corresponding to the Sr_max value (memo_out (sr_max)<=Ang._reg., PW_reg.), a storage of the memory 105 is made possible (memo_r_w=1) and the scan processor 106-5 is informed of the completion of the sort process (sort_ack=1).

Figure 18:
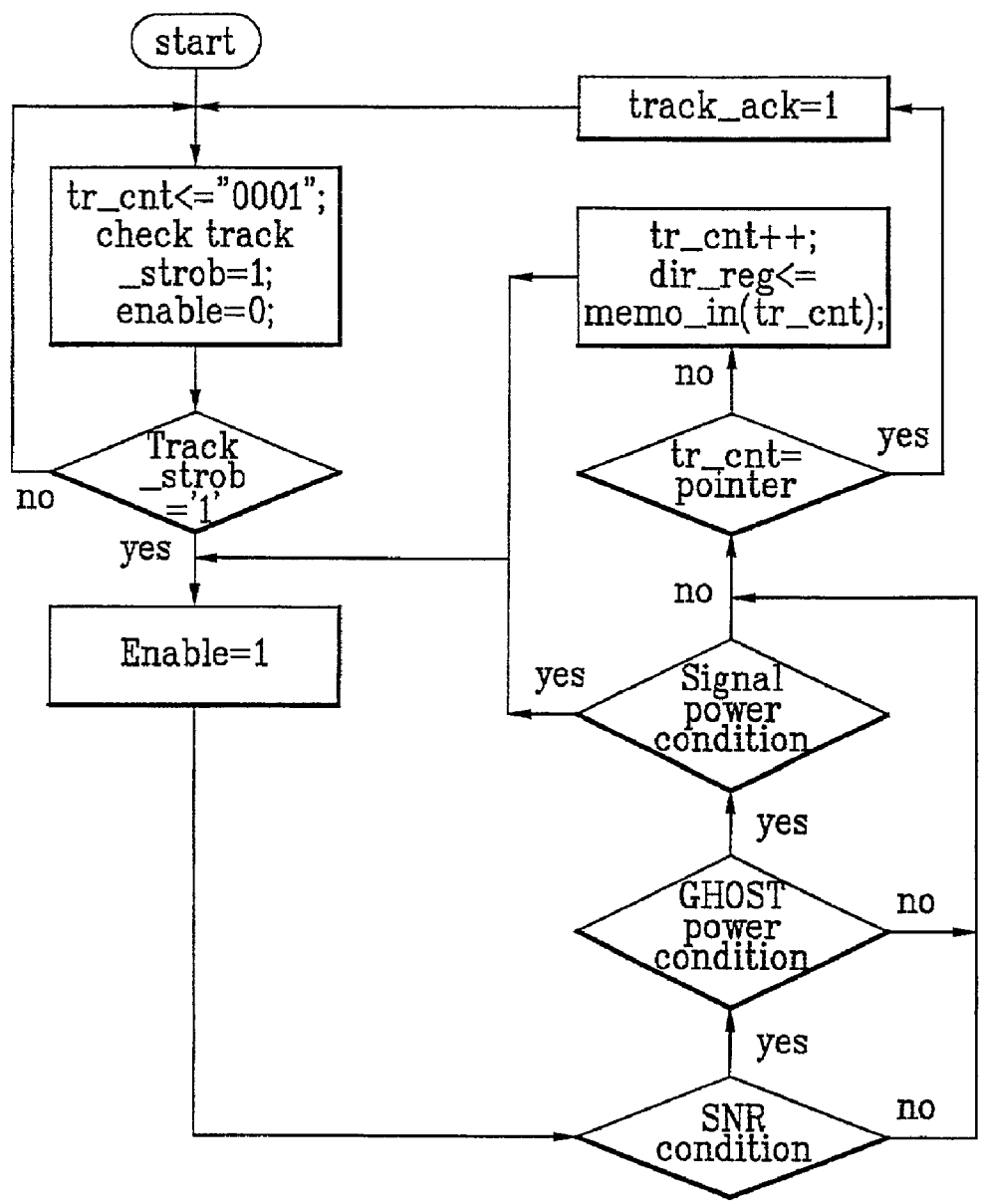
FIG. 18 illustrates a flowchart of a tracking processing of an antenna controller according to the present invention.

FIG. 18 illustrates a flowchart of a tracking processing of an antenna controller according to the present invention. First, the antenna controller 109 sets a tr_cnt variable as '1' through the tracking processor 106-4 (tr_cnt<='0001' and then checks that the sort processing process is finished (check track_strob=1). Then, execution of a sub-processing process included in the tracking processing process is enables (Enable=1). Subsequently, it is checked whether the calculated signal vs. noise ratio is effective (SNR condition), and subsequently, the effectiveness of the detected maximum ghost value and the detected signal power value is verified (GHOST power condition, Signal power condition). Subsequently, the tracking processor 106-4 of the antenna processor 109 checks that all the data stored in the memory 105 are used (tr_cnt=pointer), and increases the tr_cnt value by '1' (tr_cnt++). Successively, a value of the memory address corresponding to the tr_cnt is inputted to the direction register of the direction controller 106 (dir_reg.<memo_in(tr_cnt)), and the scan processor 106-5 is informed of a completion of the tracking processing process (track_ack=1).

Figure 19:
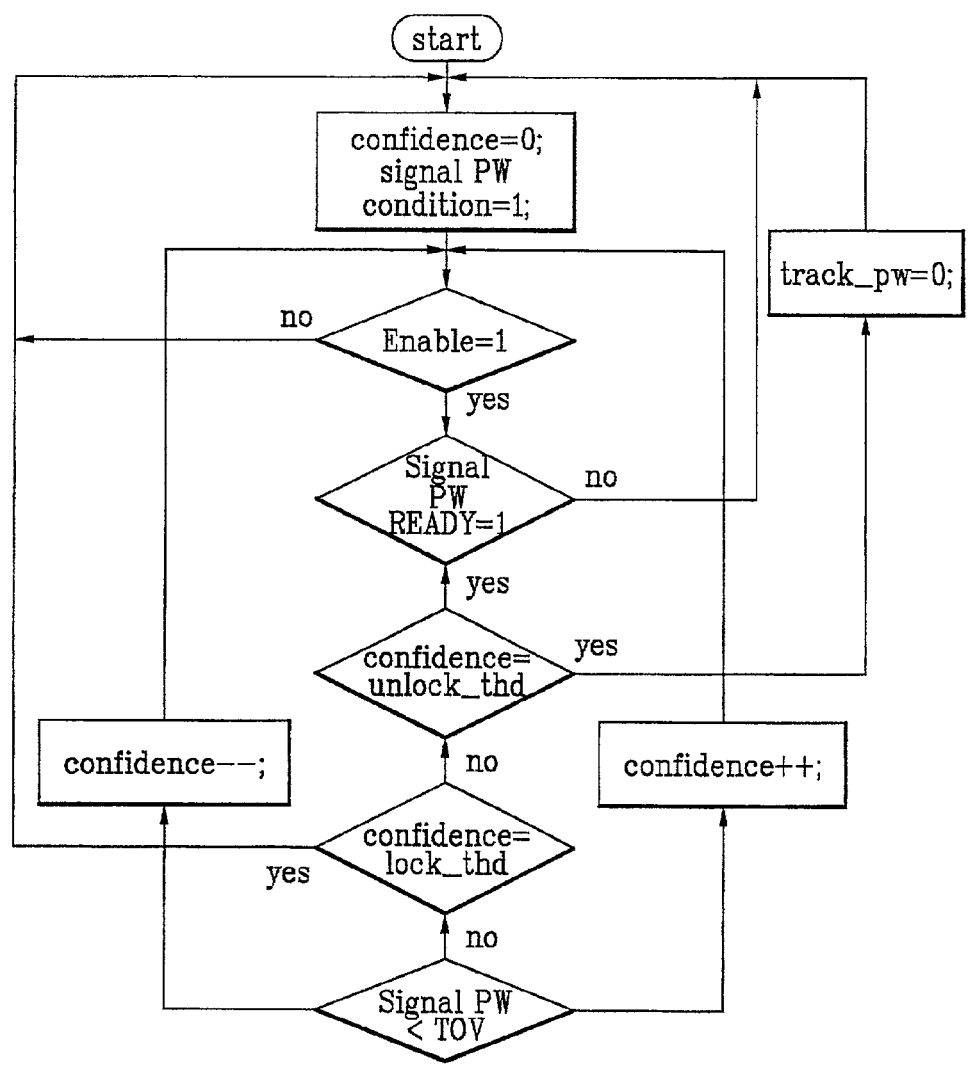
FIG. 19 illustrates a flowchart of a sub-processing of a signal power tracking process.

FIG. 19 illustrates a flowchart of a sub-processing of a signal power tracking process.

After the confidence counter is set as a value of '0' (confidence=0), a signal power condition value directing whether the detected signal power is effective is set as '1' (signal PW condition=1). Then, it is checked whether the execution of the sub processing process of the signal power tracking process is enabled (enable=1), and it is checked whether the signal power tracker 106-1 is ready for detecting a signal power (signal PW ready=1). Then, the confidence is checked by comparing a confidence value to an unlocking threshold value Unlock_thd (confidence=unlock_thd ?). Moreover, the confidence is checked by comparing the confidence value to a locking threshold value Lock_thd (confidence=lock_thd ?), and the effectiveness of the detected signal power is checked (signal PW<TOV). Then, the confidence value is decremented by '1' (confidence--) or incremented by '1' (confidence++) in accordance with whether the signal power is effective. Finally, when the confidence value is equal to the unlocking threshold value (confidence=unlock_thd), a signal power state value representing whether the detected signal power value is effective is set as '0' (signal PW condition=0).

Figure 20:
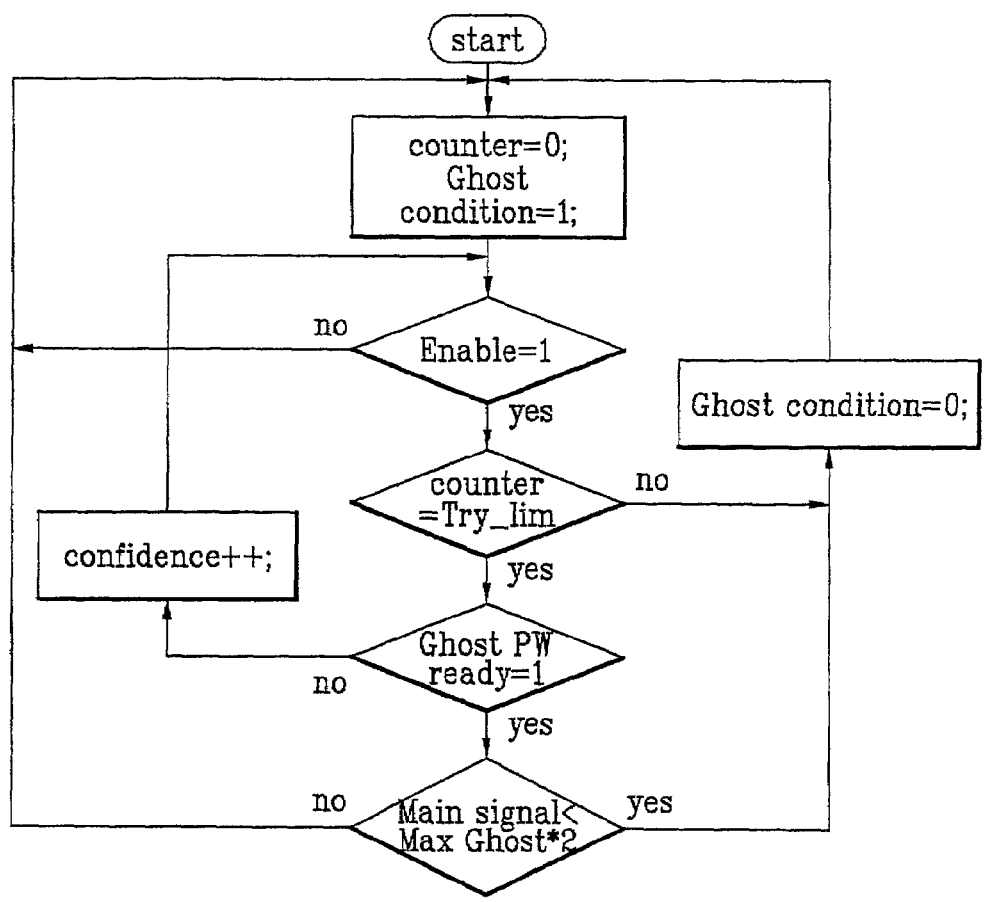
FIG. 20 illustrates a flowchart of showing a sub-processing of a maximum ghost power tracking process according to the present invention.

FIG. 20 illustrates a flowchart of showing a sub-processing of a maximum ghost power tracking process according to the present invention.

First, the ghost power tracker 106-2 sets a ghost state value representing whether the detected ghost power is effective as '1' after setting a timer counter as a '0' value (ghost PW condition=1). And, it is checked whether the execution of the sub processing is enabled (enable=1), and it is checked whether the timer counter reaches a trial limit value try_lim (counter=try_lim). After it is checked whether the maximum ghost power detector 116 is ready for detecting a ghost power (ghost PW ready=1), it is checked whether the maximum ghost power maintains a predetermined size compared to a main signal, i.e. whether the maximum ghost power is effective (main signal<max ghost*2). For instance, if the maximum ghost power maintains a predetermined size against the main signal, the ghost state value representing whether the detected ghost power is effective is set as '0' (ghost PW condition=0).

Figure 21:
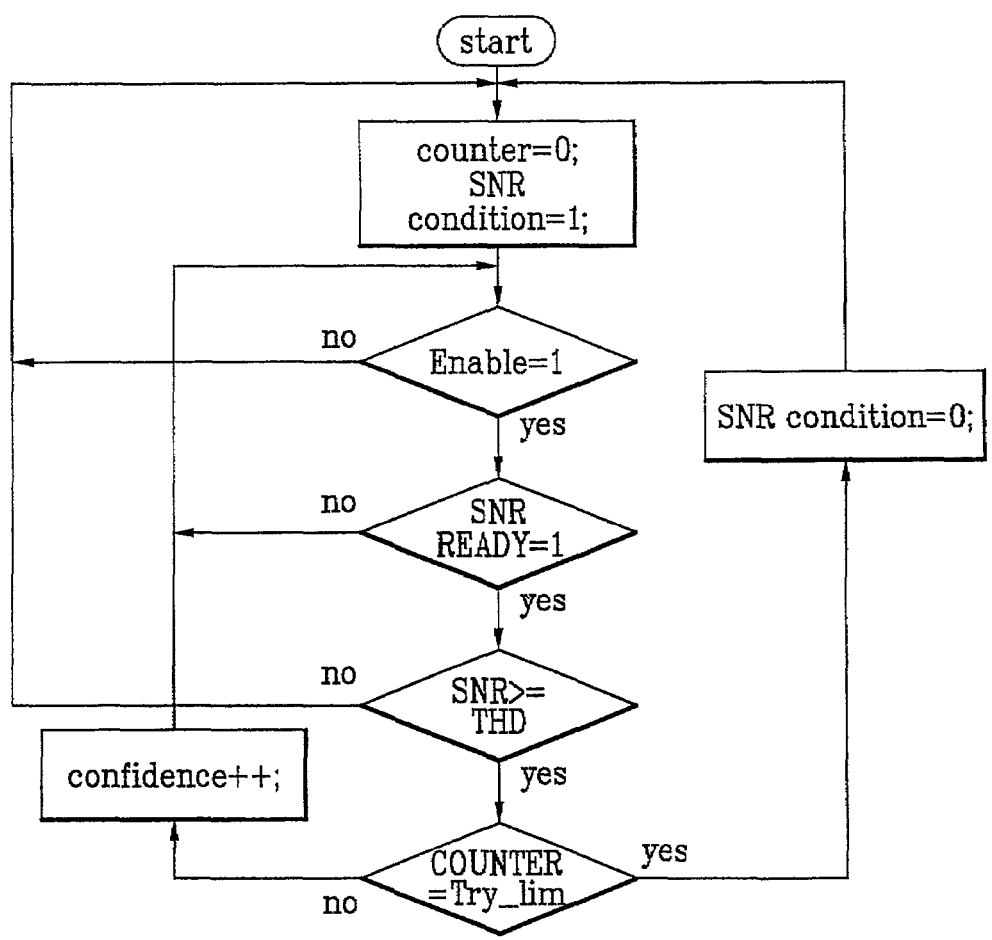
FIG. 21 illustrates a flowchart of a sub-processing of a signal vs. noise ratio tracking process.

FIG. 21 illustrates a flowchart of a sub-processing of a signal vs. noise ratio tracking process.

After the confidence counter value is set as '0' (counter=0), a signal vs. noise ratio state value representing whether the calculated signal vs. noise ratio is effective (signal PW condition=1). It is checked whether the sub processing process is enabled (enable=1) and whether the SNR calculator 104-3 is ready for detecting SNR (SNR ready=1). Moreover, it is checked whether the detected SNR is effective (SNR>=THD) and the confidence is checked by comparing the counter value to the unlocking threshold value (counter=unlock_thd). If there is no confidence, it goes back to the initial process. If the counter value counter is not equal to the trial limit value try_lim, the counter value is incremented by '1' (counter++). Then, it goes back to the step of checking whether the sub processing process is enabled. On the other hand, if the counter value is equal to the trial limit value, the ghost state value representing whether the detected SNR is effective is set as '0' (SNR condition=0). Then, it goes back to the initial step of the sub processing process. Otherwise, if it is not ready for detecting the SNR, it goes back to the step of checking whether the sub processing process is enabled.

The present invention takes a VSB receiver as an example and further enables to be applied to other wire communication fields such as an OFDM receiver and the like without limiting the scope thereof.

Accordingly, an antenna controller according to the present invention enables to simplify a hardware thereof, and further reduce the product cost by attaining channel information through a receive chip only without using additional hardware in order to observe a channel.

And, the present invention attains channel information for controlling an antenna from an automatic gain controller as an initial step in a demodulation part of a digital television receiver, a data segment synchronizer as a middle step, an equalizer as a terminal step, and an SNR calculator step by step, thereby enabling to control an antenna of a digital television receiver with prompt judgment and high confidence.

Moreover, the present invention enables to operate independently from a digital television receiver, thereby having compatibility with other digital television receivers.

Further, the present invention of which control parts are constructed with a digital system so as to comprise a single chip and further increase integration of a device.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A digital television receiver comprising:
    an antenna receiving channel signals of digital television broadcasting and having a directionality dependent on a control signal;
    a signal processing part tuning a wanted channel signal from the channel signals and processing the tuned channel signal as a wanted form;
    a detection part detecting state signals of the channel signal outputted from the signal processing part, wherein the state signals include a power of the channel signal, a power of a ghost signal, and a signal vs. noise ratio;
    a memory, when every new state signal is detected, storing a detected new state signal sorted with previously-detected state signals;
    a control part producing the control signal corresponding to an optimal direction of the antenna by comparing the new state signal to the previous state signals; and
    an interface part providing the antenna with the control signal,
    wherein the control part comprises:
        a signal power tracker tracking the power of the tuned channel signal using an output signal of a signal power detector;
        a ghost power tracker tracking the power of the ghost signal using an output signal of a ghost power detector;
        a signal vs. noise ratio (SNR) tracker tracking the signal vs. noise ratio using an output of a signal vs. noise ratio calculator;
        a tracking processor tracking states of the tuned channel signal using output signals of the trackers in a presently-selected antenna pattern and then changing the antenna pattern in order stored in the memory if the tracked states fail to maintain effective value sizes;
        a scan processor attaining an effective signal power and antenna pattern by varying the directionality of the antenna using an output signal of the tracking processor and then storing the power and pattern values in the memory; and
        a sort processor aligning the stored antenna pattern values in order of the signal power values.

2. The digital television receiver of claim 1, wherein the antenna includes a smart antenna.

3. The digital television receiver of claim 1, wherein the signal processing part comprises:
    a tuner tuning a wanted channel signal from channel signals received through the antenna;
    an intermediate frequency automatic gain control part controlling automatically an intermediate frequency gain of the channel signal tuned by the tuner; and
    a receive chip taking a signal having the wanted form from an output signal of the intermediate frequency automatic gain control part and providing the detection part with the taken signal.

4. The digital television receiver of claim 3, wherein the receive chip is a VSB (Vestigial Side Band) receive chip for getting a VSB signal.

5. A digital television receiver comprising:
    an antenna having a directionality according to a control signal;
    a signal processing part making a digital television channel signal from the antenna have a signal of a predetermined form;
    a detection part attaining state signals from an output signal of the signal processing part, wherein the state signals include a power of the channel signal, a power of a ghost signal, and a signal vs. noise ratio;
    a memory updating and storing previously-detected state signals and a new state signal;
    a direction controller attaining the control signal for controlling the direction of the antenna by comparing new state signals of the detection part to the previous state signals stored in the memory; and
    an interface part connected between the antenna and the direction controller and providing the antenna with the control signal so as to control the direction of the antenna in accordance with the control signal,
    wherein the direction controller comprises:
        a signal power tracker tracking the power of the tuned channel signal using an output signal of a signal power detector;
        a ghost power tracker tracking the power of the ghost signal using an output signal of a ghost power detector;
        a signal vs. noise ratio (SNR) tracker tracking the signal vs. noise ratio using an output of a signal vs. noise ratio calculator;
        a tracking processor tracking states of the tuned channel signal using output signals of the trackers in a presently-selected antenna pattern and then changing the antenna pattern in order stored in the memory if the tracked states fail to maintain effective value sizes;
        a scan processor attaining an effective signal power and antenna pattern by varying the directionality of the antenna using an output signal of the tracking processor and then storing the power and pattern values in the memory; and
        a sort processor aligning the stored antenna pattern values in order of the signal power values.

6. The digital television receiver of claim 5, wherein the signal of the predetermined form is a VSB (Vestigial Side Band) signal.

7. The digital television receiver of claim 6, wherein the signal processing part comprises:
    a tuner tuning a wanted channel signal from channel signals received through the antenna;
    an intermediate frequency automatic gain control part controlling automatically an intermediate frequency gain of the channel signal tuned by the tuner; and
    a VSB receive chip taking a VSB signal from an output signal of the intermediate frequency automatic gain control part and providing the detection part with the VSB signal.

8. The digital television receiver of claim 7, wherein the VSB receive chip comprises:
    an automatic gain control part controlling a gain of an output signal of the intermediate frequency automatic gain control part;
    a timing and carrier restoration part restoring a timing and carrier loss on an output signal of the automatic gain control part;
    an equalizer equalizing an output signal of the timing and carrier restoration part;

a phase tracker tracking a phase of an output signal of the equalizer; and a forward error corrector correcting a forward error on an output signal of the phase tracker and outputting the VSB signal.

9. The digital television receiver of claim 8, wherein an automatic gain control (AGC) system of the tuned channel signal controls a gain of an intermediate frequency signal through a electric charge pump & lag filter from the VSB receive chip and a gain of a high frequency signal automatically using an automatic gain control signal delayed in the intermediate frequency automatic gain control part.

10. The digital television receiver of claim 8, wherein the intermediate frequency signal and high frequency signal gains are controlled automatically by the VSB receive chip in accordance with an automatic gain control system.

11. The digital television receiver of claim 5, wherein the direction controller makes the scan processor carry out the scanning again if it is judged that there is no antenna pattern having an effective size in the memory by the operation of the tracking processor.

12. The digital television receiver of claim 5, wherein the direction controller further comprises general registers including a pointer register representing an address of the memory, a direction register always storing the present antenna state value, an angle register storing temporarily a state value of the antenna, and a power register storing a power value of a received signal temporarily.

13. A digital television receiver comprising:
an antenna having a directionality according to a control signal;
a signal processing part making a digital television channel signal from the antenna have a signal of a predetermined form;
a detection part attaining state signals from an output signal of the signal processing part, wherein the state signals include a power of the channel signal, a power of a ghost signal, and a signal vs. noise ratio;
a memory updating and storing previously-detected state signals and a new state signal;
a direction controller attaining control signal for controlling the direction of the antenna by comparing new state signals of the detection part to the previous state signals stored in the memory; and
an interface part connected between the antenna and the direction controller and providing the antenna with the control signal so as to control the direction of the antenna in accordance with the control signal,
wherein the signal of the predetermined form is a VSB (Vestigial Side Band) signal,
wherein the signal processing part comprises:
a tuner tuning a wanted channel signal from channel signals received through the antenna;
an intermediate frequency automatic gain control part controlling automatically an intermediate frequency gain of the channel signal tuned by the tuner; and
a VSB receive chip taking a VSB signal from an output signal of the intermediate frequency automatic gain control part and providing the detection part with the VSB signal,
wherein the VSB receive chip comprises:
an automatic gain control part controlling a gain of an output signal of the intermediate frequency automatic gain control part;
a timing and carrier restoration part restoring a timing and carrier loss on an output signal of the automatic gain control part;
an equalizer equalizing an output signal of the timing and carrier restoration part;
a phase tracker tracking a phase of an output signal of the equalizer; and
a forward error corrector correcting a forward error on an output signal of the phase tracker and outputting the VSB signal, and
wherein the detection part comprises:
a signal power detector tracking the power of the tuned channel signal using an automatic gain control signal from the automatic gain control part of the VSB receive chip;
a ghost power detector tracking the power of a ghost signal using an output signal from the equalizer or an output signal of the timing and carrier restoration part of the VSB receive chip; and
a signal vs. noise ratio (SNR) calculator calculating a ratio between a signal and a noise using an output signal of the phase tracker of the VSB receive chip.

14. The digital television receiver of claim 13, wherein the ghost signal power detector comprises:
a data segment synchronization correlative calculating a correlation value between an I channel signal received from the VSB receive chip and a previously-set synchronization signal value;
a segment integrator accumulating output values of the data segment synchronization correlative in 832 delayers;
a slicer providing an increased count value when the accumulated correlation value reaches a predetermined size;
a confidence counter increasing a count number according to the increased count value; and
a maximum ghost power detection controller transferring a ghost power ready signal and a standardization value resulted from standardizing a maximum ghost power into a power of a received channel signal to the direction controller when a value of the confidence counter reaches a reference value.

15. The digital television receiver of claim 14, wherein, in the VSB transmission system, a synchronization signal inserted into each data segment is "1001".

16. The digital television receiver of claim 13, wherein the signal vs. noise ratio calculator comprises:
a subtractor subtracting a demodulated signal constellation from a decision signal constellation;
a squarer squaring an output of the subtractor;
an accumulator accumulating output signals of the squarer;
a latch delaying an output of the accumulator; and
a divider dividing an output of the latch into a window size m of the segment integrator of the ghost signal power detector.

17. The digital television receiver of claim 16, wherein the signal vs. noise ratio is attained by the following algorithms: a signal vs. noise ratio SNR=10 log(Ps/Pn); and Pnlmse=sigma(k is 1 to n)(mse/m), where Ps is a signal power(=1), Pn is a noise power (Pnlmse), '$R_{13}$ 1' and 'D_1' are a demodulated signal constellation(received constellation) and a decided signal constellation(decision constellation), respectively, and 'm' designates a window size of the integrator.

* * * * *